(12) United States Patent
Mitani

(10) Patent No.: US 10,908,109 B2
(45) Date of Patent: Feb. 2, 2021

(54) HUMIDITY SENSOR AND METHOD OF MANUFACTURING SAME

(71) Applicant: MINEBEA MITSUMI Inc., Nagano (JP)

(72) Inventor: Yuta Mitani, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 23 days.

(21) Appl. No.: 16/444,094

(22) Filed: Jun. 18, 2019

(65) Prior Publication Data

US 2020/0018716 A1 Jan. 16, 2020

(30) Foreign Application Priority Data

Jul. 12, 2018 (JP) .................................. 2018-132189

(51) Int. Cl.
*G01N 27/22* (2006.01)

(52) U.S. Cl.
CPC ......... *G01N 27/223* (2013.01); *G01N 27/226* (2013.01)

(58) Field of Classification Search
None
See application file for complete search history.

(56) References Cited

U.S. PATENT DOCUMENTS

| | | | |
|---|---|---|---|
| 2006/0096370 A1* | 5/2006 | Isogai | G01N 27/223 73/335.04 |
| 2008/0316673 A1 | 12/2008 | Hoofman et al. | |
| 2013/0063163 A1* | 3/2013 | Sim | G01N 27/223 324/663 |
| 2015/0219581 A1* | 8/2015 | Santangelo | G01N 27/227 73/335.04 |

FOREIGN PATENT DOCUMENTS

| | | |
|---|---|---|
| JP | H04-019553 | 1/1992 |
| JP | 2009-516192 | 4/2009 |

* cited by examiner

*Primary Examiner* — Jas A Sanghera
(74) *Attorney, Agent, or Firm* — IPUSA, PLLC

(57) ABSTRACT

A humidity sensor including a lower electrode formed on a substrate, a plastic deformation inhibiting film formed on the lower electrode to inhibit plastic deformation of the lower electrode, a humidity sensitive film covering the lower electrode through the plastic deformation inhibiting film, and an upper electrode formed on the humidity sensitive film.

14 Claims, 10 Drawing Sheets

HILLOCK

HILLOCK

HUMIDITY SENSOR AND METHOD OF MANUFACTURING SAME

CROSS REFERENCE TO RELATED APPLICATIONS

This application is based on and claims priority to Japanese Patent Application No. 2018-132189, filed Jul. 12, 2018. The entire contents of Japanese Patent Application No. 2018-132189 are hereby incorporated by reference.

BACKGROUND OF THE INVENTION

1. Field of the Invention

The present invention relates to a humidity sensor of a capacitance type and a manufacturing method for manufacturing the same.

2. Description of the Related Art

Humidity sensors include capacitance type humidity sensors, in which a humidity sensitive film, formed of a polymeric material whose dielectric constant varies depending on the absorbed humidity, is used as a dielectric substance. As an electrode structure of this capacitance type humidity sensor, a comb-tooth type and a parallel-plate type are known.

The comb-tooth type is a structure in which a pair of opposing comb-like electrodes are provided on the same plane and a humidity sensitive film is provided on the pair of comb-like electrodes (see, for example, Patent Document 1).

The parallel-plate type has a structure in which a humidity sensitive film is provided between a lower electrode formed on a substrate and an upper electrode disposed opposite to each other on the lower electrode. In this parallel-plate type humidity sensor, the humidity sensitive film is formed on a substrate on which the lower electrode is formed, for example, using spin coating and photolithography techniques.

As a polymeric material that forms the humidity sensitive film, it has been proposed that, for example, polyimide is used to perform a heat treatment on the humidity sensitive film after the formation of the humidity sensitive film (see, e.g., Patent Document 2).

[Patent Document 1] PCT Japanese Translation Patent Publication No. 2009-516192

[Patent Document 2] Japanese Unexamined Patent Publication No. 4-19553

SUMMARY OF THE INVENTION

However, when the humidity sensor of the parallel-plate type is manufactured, the humidity sensitive film is formed on the lower electrode, and then the heat treatment is performed on the humidity sensitive film, the lower electrode may be heated to cause a migration phenomenon. When the migration phenomenon occurs in the lower electrode, a projection called a hillock grows spontaneously on the surface of the lower electrode. If this projection grows on the lower electrode and penetrates the humidity sensitive film, the lower electrode and the upper electrode are electrically short-circuited and the humidity sensor becomes inoperable.

The present invention is to provide a humidity sensor and a method of manufacturing the same that enables inhibition of the generation of the hillock on the lower electrode.

The disclosed technique is about a humidity sensor having a lower electrode formed on a substrate, a plastic deformation inhibiting film formed on the lower electrode to inhibit plastic deformation of the lower electrode, a humidity sensitive film covering the lower electrode through the plastic deformation inhibiting film, and an upper electrode formed on the humidity sensitive film.

The purposes and advantages of other embodiments are presented in part in the following specification, some of which are obvious from the specification and may also be obtained by practicing the invention.

The purposes and advantages of other embodiments of the present application are realized or achieved by the elements and combinations thereof specifically indicated by the appended claims.

The foregoing general description and the following detailed description are merely illustrative, and the following description does not limit the claimed invention.

DETAILED DESCRIPTION OF EMBODIMENTS

Description of Problems of Related Art

Figure 1:
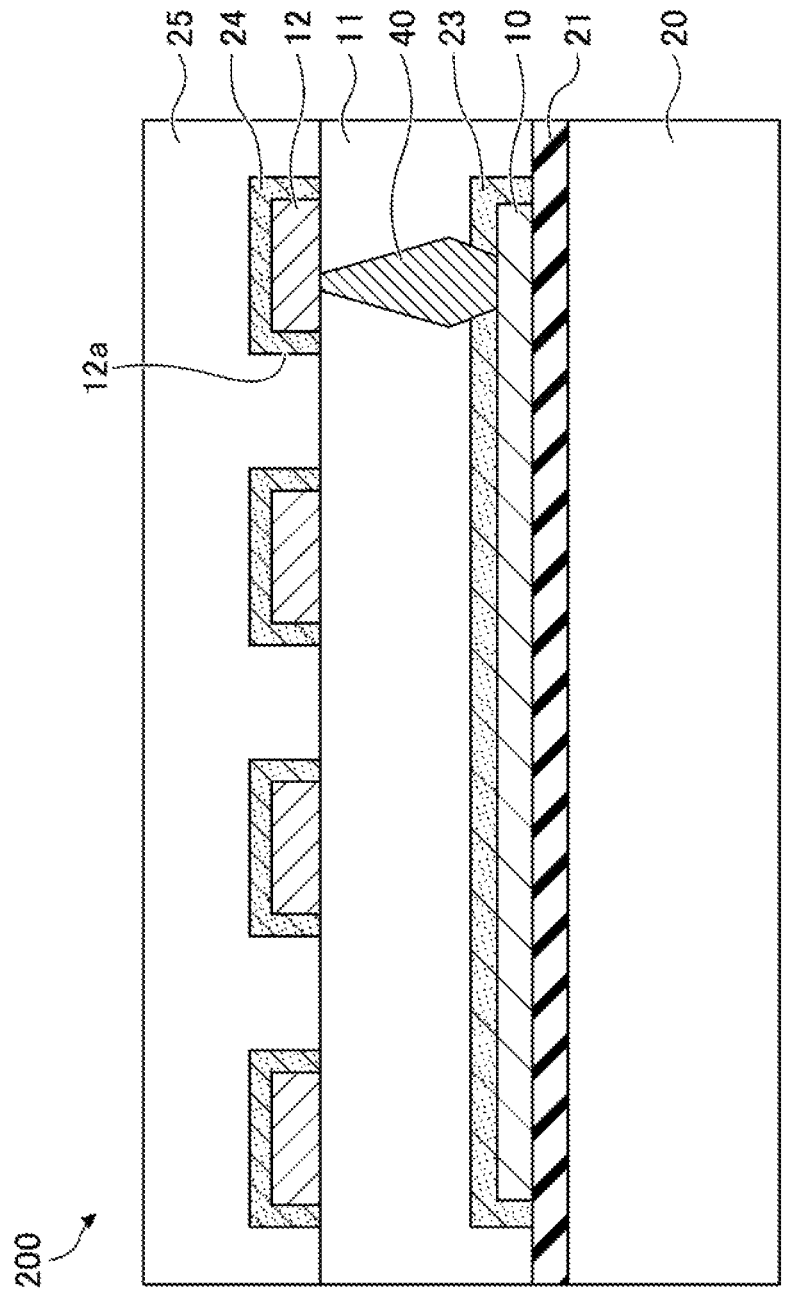
FIG. 1 is a cross-sectional view of a humidity sensor for explaining problems of a related art.

Before describing the embodiments, the problems of the related art will be described in more detail. FIG. 1 is a cross-sectional view of a humidity sensor 200 for illustrating problems of the related art.

The humidity sensor 200 is a parallel-plate capacitance humidity sensor. A lower electrode 10 is provided on the insulating substrate 20 via an insulating film 21. A humidity sensitive film 11 is provided on the lower electrode 10 through a protective film 23. The protective film 23 is, for example, a silicon oxide ($SiO_2$) film having a thickness of 100 nm. The humidity sensitive film 11 is made from, for example, polyimide.

An upper electrode 12 having multiple openings 12a is formed on the humidity sensitive film 11. An overcoat film 25 is formed on an upper electrode 12 via a protective film 24.

When the humidity sensor 200 is manufactured, after the humidity sensitive film 11 is formed, heat treatment is provided for the humidity sensitive film 11. This heat treatment may cause a migration phenomenon in the lower electrode 10. When the migration phenomenon occurs in the lower electrode 10, a projection 40 called a hillock grows spontaneously from the lower electrode 10, as illustrated in the figure. When the projection 40 penetrates the humidity sensitive film 11, the lower electrode 10 and the upper electrode 12 are electrically short-circuited and the humidity sensor 200 becomes inoperable. The Hillock also includes a needle-like protrusion called a whisker.

In the same figure, a protective film 23 is provided on the lower electrode 10. However, because the protective film 23 is intended to suppress the influence of oxidation, corrosion, etc. of the lower electrode 10, the generation of the projection 40 cannot be suppressed.

Hereinafter, a mode of carrying out the invention will be described with reference to the figures. In each figure, the same component parts may be denoted by the same reference numerals and duplicate descriptions may be omitted.

First Embodiment

Schematic Structure

Figure 2:
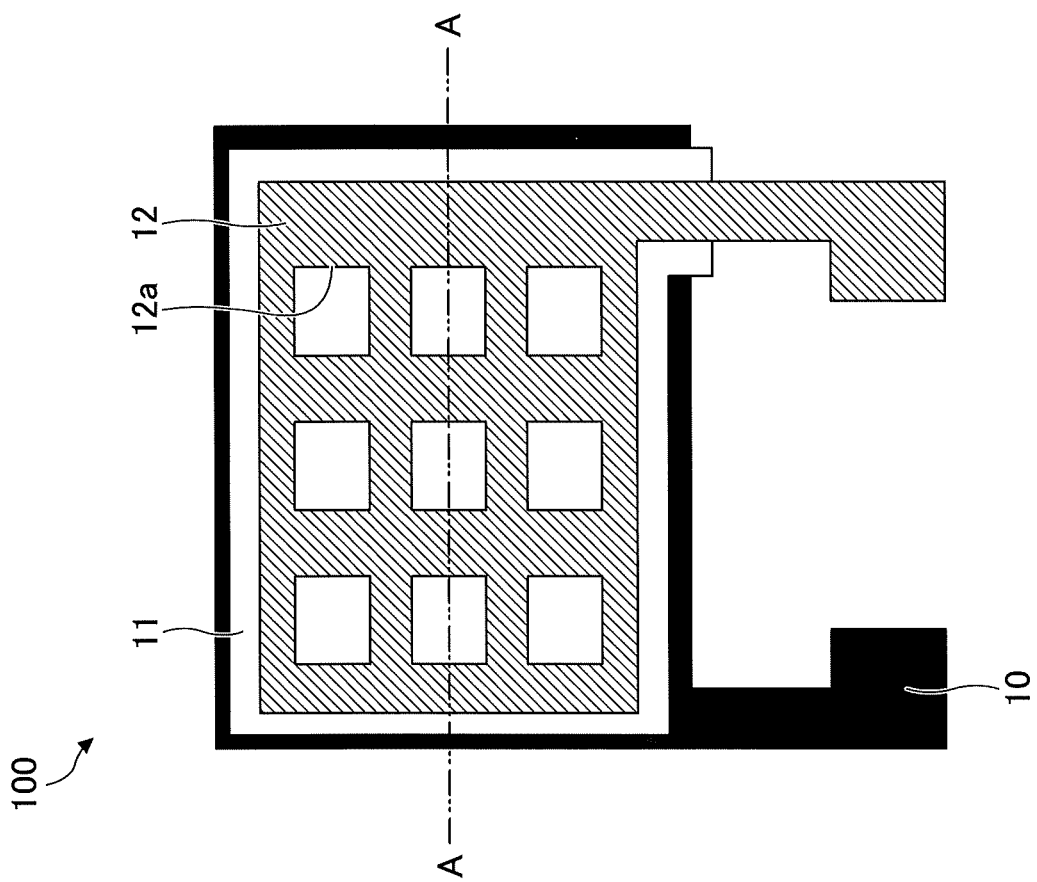
FIG. 2 is a plan view illustrating a schematic structure of a humidity sensor according to a first embodiment.
Figure 3:
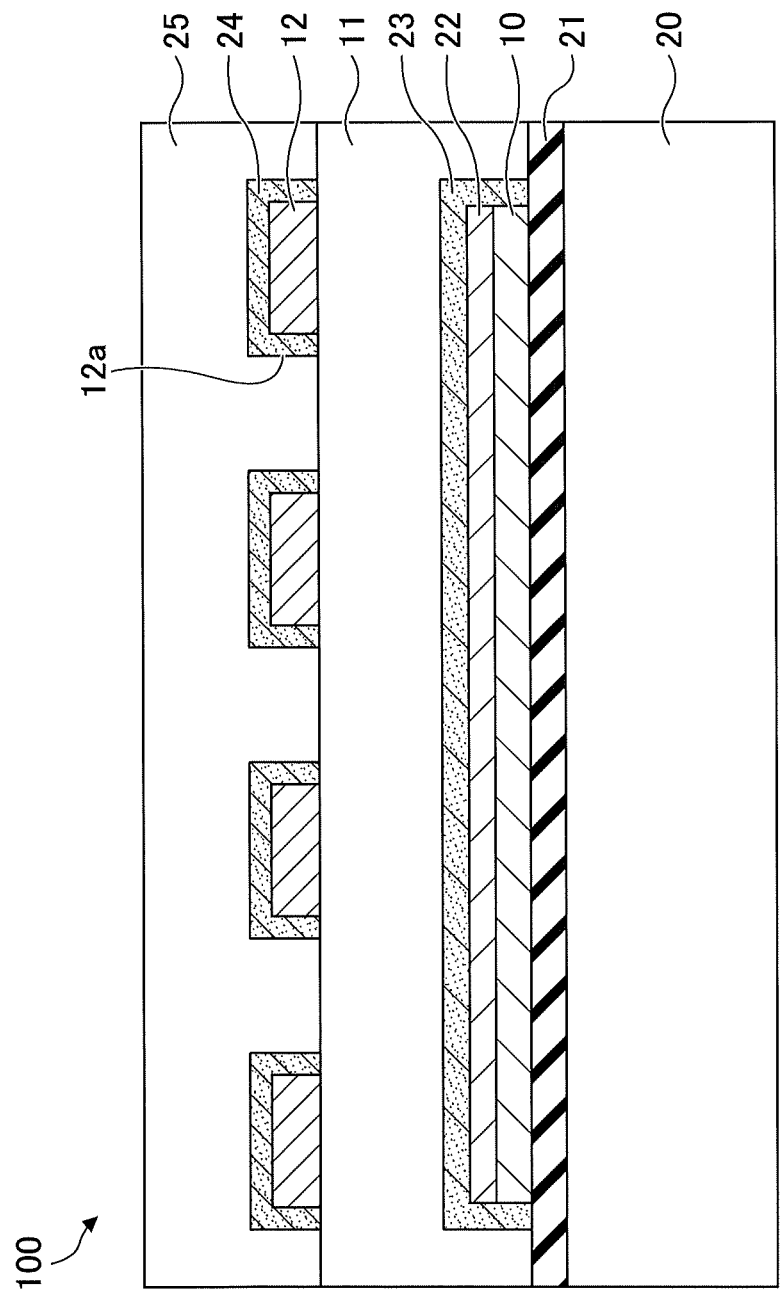
FIG. 3 is a cross-sectional view schematically illustrating a cross-section along an A-A line of FIG. 1.

The structure of the humidity sensor according to a first embodiment will be described. FIG. 2 is a plan view illustrating a schematic structure of a humidity sensor 100 according to the first embodiment. FIG. 3 is a cross-sectional view schematically illustrating a cross section along an A-A line of FIG. 2. In FIG. 2, only the lower electrode 10, the humidity sensitive film 11, and the upper electrode 12 included in the humidity sensor 100 are schematically illustrated.

The humidity sensor 100 is a parallel-plate capacitance humidity sensor. The humidity sensor 100 is formed using an insulating substrate 20, such as a silicon (Si) substrate, as a base. An insulating film 21 made from $SiO_2$ or the like is disposed on the insulating substrate 20.

A flat plate-like lower electrode 10 is provided on the insulating film 21. The lower electrode 10 is, for example, a conductive film formed by an Al—Si—Cu alloy, which is a type of aluminum alloy. The thickness of the lower electrode 10 is, for example, 200 nm. The lower electrode 10 may be formed of other aluminum alloys, such as Al—Si alloy.

A plastic deformation inhibiting film 22 for inhibiting plastic deformation of the lower electrode 10 is provided on the lower electrode 10. The plastic deformation inhibiting film 22 is provided only on the surface of the lower electrode 10 and has the same planar shape as the lower electrode 10. The plastic deformation inhibiting film 22 is a harder film than the lower electrode 10, for example a titanium nitride (TiN) film. Preferably, the thickness of the plastic deformation inhibiting film 22 is not less than 100 nm. The thickness of the plastic deformation inhibiting film 22 is, for example, 100 nm. The plastic deformation inhibiting film 22 is not limited to a TiN film, and may be a TiW film or the like.

The plastic deformation inhibiting film 22 is electrically conductive and contacts the lower electrode 10 and functions as part of the lower electrode 10.

A protective film 23 formed of silicon oxide or the like is provided on the plastic deformation inhibiting film 22. The protective film 23 covers the upper surface of the plastic deformation inhibiting film 22 and the sides of the plastic deformation inhibiting film 22 and the lower electrode 10. The thickness of the protective film 23 is, for example, 100 nm. The protective film 23 may be formed of alumina ($Al_2O_3$) or silicon nitride (SiN).

A humidity sensitive film 11 is provided on the lower electrode 10 through the plastic deformation inhibiting film 22 and the protective film 23. The humidity sensitive film 11 entirely covers the protective film 23, the plastic deformation inhibiting film 22, and the lower electrode 10. The humidity sensitive film 11 is formed of a polymeric material having a thickness of 0.5 μm to 1.5 μm, which is easy to adsorb to water molecules. The humidity sensitive film 11 is preferably, for example, a polyimide film having a thickness of 1 μm.

The polymeric material forming the humidity sensitive film 11 is not limited to polyimide, and may be cellulose, polymethylmethacrylate (PMMA), polyvinyl alcohol (PVA), or the like. The protective film 23 on the plastic deformation inhibiting film 22 is not essential, and the humidity sensitive film 11 may be directly disposed on the plastic deformation inhibiting film 22.

The upper surface of the humidity sensitive film 11 is flat, and an upper electrode 12 like a flat plate is formed on the upper surface. The upper electrode 12 is, for example, a conductive film made of aluminum (Al) or the like having a thickness of 200 nm. The upper electrode 12 faces the lower electrode 10 through the humidity sensitive film 11, the protective film 23, and the plastic deformation inhibiting film 22.

Multiple openings 12a are formed in the upper electrode 12 to efficiently incorporate water molecules in the air into the humidity sensitive film 11. These openings 12a make the planar shape of the upper electrode 12 like a grid. The openings 12a are preferably as small as possible. The smaller the opening 12a is, more the leakage of electric fields into the air is prevented. Practically, a great number of openings 12a are formed. The planar shape of the upper electrode 12 is not limited to be a lattice-like shape, and may be in a ladder-like shape or the like.

A protective film 24 made of silicon oxide or the like is formed on the upper electrode 12. The protective film 24 is provided to prevent oxidation or corrosion of the upper electrode 12, but is not required.

An overcoat film 25 is provided on the upper electrode 12 via a protective film 24. The overcoat film 25 is made of a polymeric material and is made of the same material as the humidity sensitive film 11, for example. The thickness of the overcoat film 25 is, for example, 0.5 μm to 10 μm.

The overcoat film 25 is provided with an opening (not illustrated) for power connection in which a portion of the upper electrode 12 is exposed. In addition, the overcoat film 25 and the humidity sensitive film 11 are provided with an opening (not illustrated) for power connection in which a portion of the lower electrode 10 is exposed.

Manufacturing Method

Figure 4:
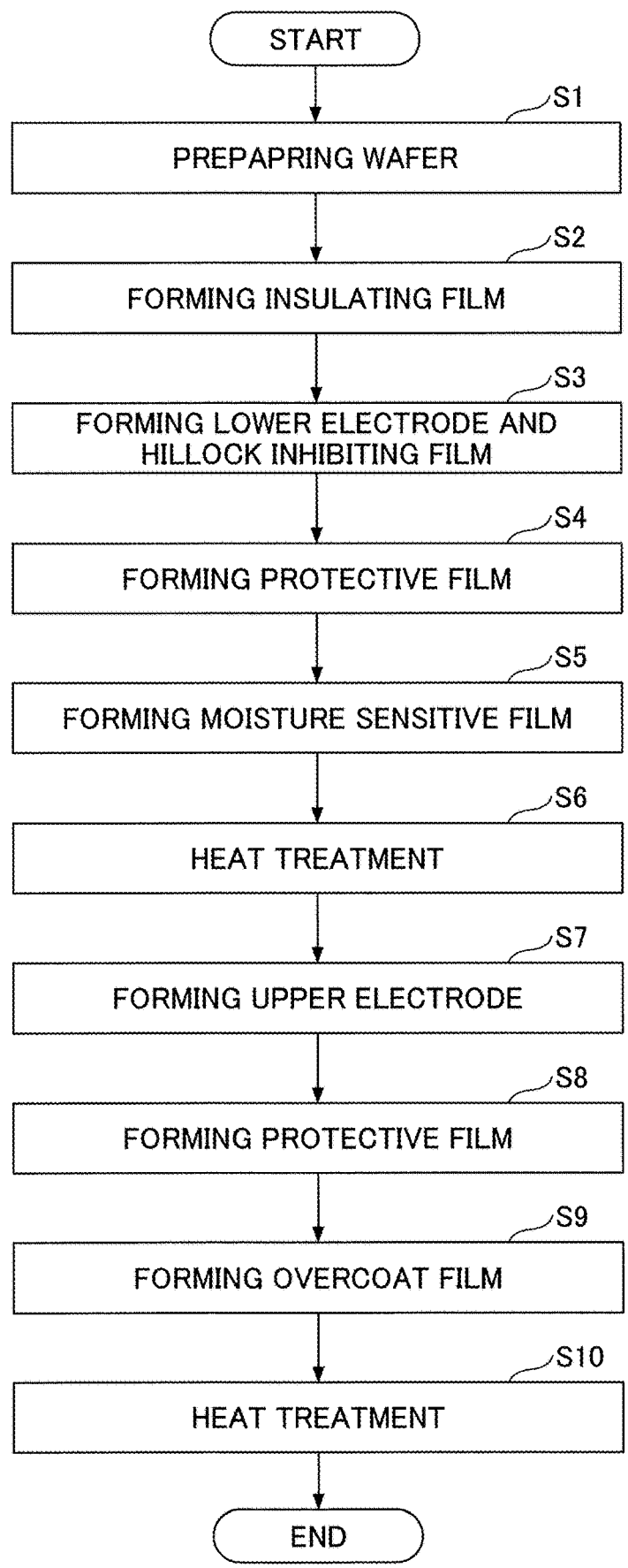
FIG. 4 illustrates a process of manufacturing a humidity sensor.
Figure 5:
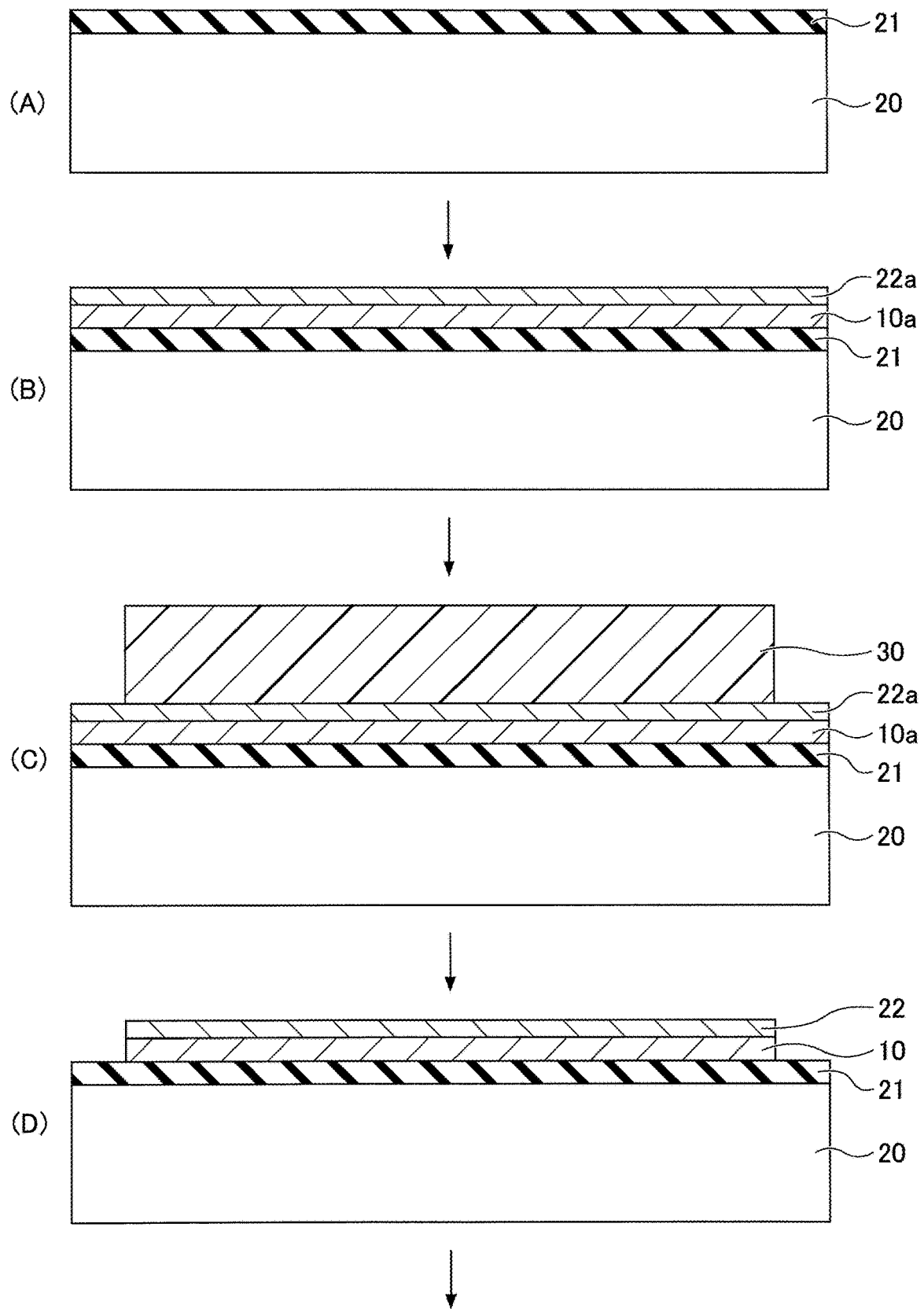
FIG. 5 illustrates a cross-sectional structure of the humidity sensor in the manufacturing process.
Figure 6:
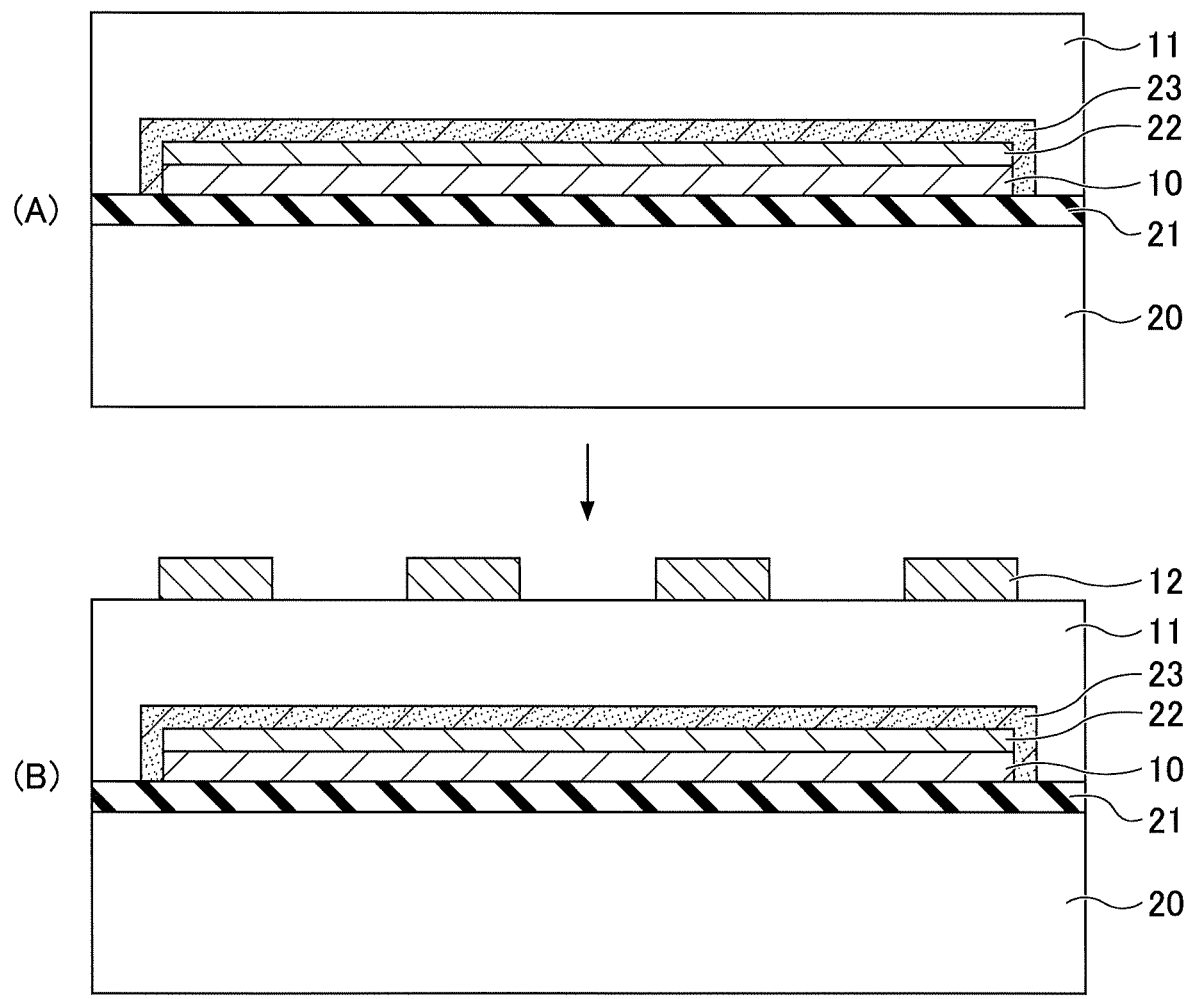
FIG. 6 is a view illustrating the cross-sectional structure of the humidity sensor in the manufacturing process.

Next, a manufacturing method of manufacturing a humidity sensor 100 will be described. FIG. 4 is a flowchart illustrating a process of manufacturing the humidity sensor 100. FIGS. 5 and 6 are diagrams illustrating a cross-sectional structure of the humidity sensor 100 in the manufacturing process.

First, a silicon wafer is provided as an insulating substrate 20 (step S1). Next, as illustrated in (A) of FIG. 5, an $SiO_2$ film as an insulating film 21 is formed on the insulating substrate 20 (Step S2).

Next, as illustrated in (B) of FIG. 5, the first conductive film 10a for forming the lower electrode 10 is formed on the insulating film 21 having a film thickness of, for example, 200 nm, and the second conductive film 22a for forming the plastic deformation inhibiting film 22 is formed on the first conductive film 10a having a film thickness of, for example, 100 nm. Thus, the second conductive film 22a is laminated on the first conductive film 10a. For example, the material of the first conductive film 10a is an Al—Si—Cu alloy and the material of the second conductive film 22a is TiN.

Next, a resist film is formed on the second conductive film 22a and photolithography is performed to form a resist pattern 30 having a predetermined shape as illustrated in (C) of FIG. 5. Then, the second conductive film 22a is processed by an etching method such as ion milling using the resist pattern 30 as a mask, and the first conductive film 10a is subsequently fabricated. The resist pattern 30 is then removed and washed. Thus, as illustrated in (D) of FIG. 5, a lower electrode 10 and a plastic deformation inhibiting film 22 are formed (Step S3).

Next, the $SiO_2$ film as the protective film 23 is formed to have a film thickness of, for example, 100 nm so as to cover the plastic deformation inhibiting film 22 (Step S4). As illustrated in (A) of FIG. 6, in step S5, the humidity sensitive film 11 is formed so as to entirely cover the plastic deformation inhibiting film 22 and the lower electrode 10 through the protective film 23. Specifically, for example, polyimide as a polymeric material is applied to have a thickness of, for example, 1 μm by means of spin coat, bar coater, spray coater, or the like, and prebaked. The resist pattern (not illustrated) is formed on the humidity sensitive film 11, and the humidity sensitive film 11 is processed into a predetermined shape based on the resist pattern. The resist pattern is then removed and washed.

Then, in step S6, a heat treatment is performed on the humidity sensitive film 11 in a nitrogen gas atmosphere of, for example, 350° C. for about 3 hours. By this heat treatment, the humidity sensitive film 11 forms a cross-linked structure and cures.

Next, a third conductive film is formed on the humidity sensitive film 11 and processed based on the resist pattern to form the upper electrode 12 having a predetermined shape as illustrated in (B) of FIG. 6 (Step S7).

Next, a $SiO_2$ film as a protective film 24 is formed so as to cover the upper electrode 12 (Step S8) and an overcoat film 25 is formed so as to cover the upper electrode 12 through the protective film 24 (Step S9). The overcoat film 25 is made of, for example, polyimide, which is the same polymeric material as the humidity sensitive film 11. The method of forming the overcoat film 25 is similar to the method of forming the humidity sensitive film 11. Thereafter, the humidity sensor 100 having the structure illustrated in FIG. 3 is completed by performing heat treatment similar to that in Step S6 (Step S10).

Effect

In the humidity sensor 100 according to the first embodiment, the plastic deformation inhibiting film 22 being more rigid than the lower electrode 10 is disposed on the lower electrode 10. Therefore, after the humidity sensitive film 11 is disposed, the occurrence of the plastic deformation and migration phenomenon of the lower electrode 10 by performing a heat treatment on the humidity sensitive film 11 is prevented. As a result, the generation of a hillock (a projection 40) as illustrated in FIG. 1 is inhibited, and the short circuit between the lower electrode 10 and the upper electrode 12 due to the hillock is inhibited.

Figure 7A:
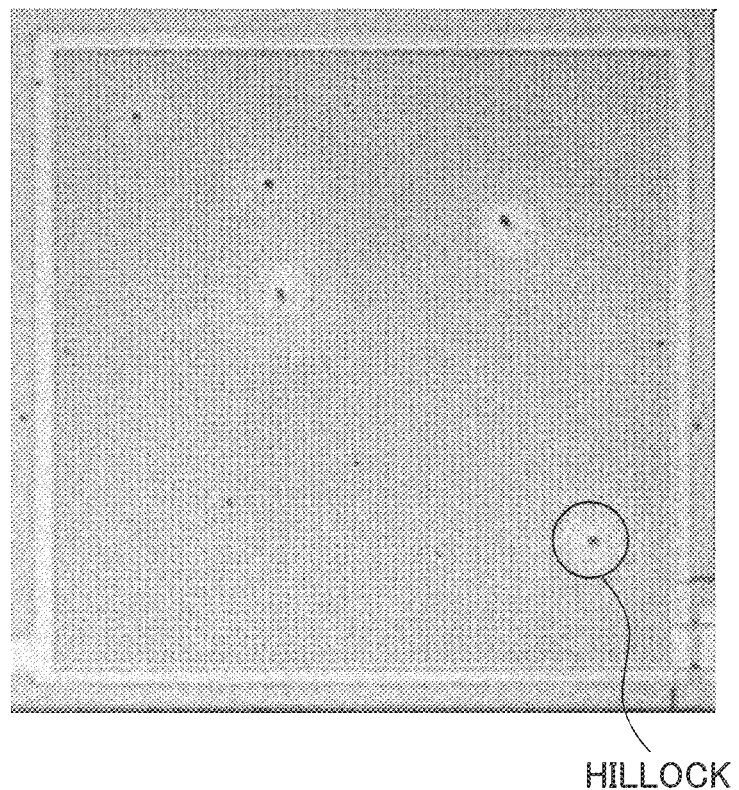
FIGS. 7A and 7B are optical microscope photographs illustrating an effect of inhibiting a hillock by a plastic deformation inhibiting film.
Figure 7B:
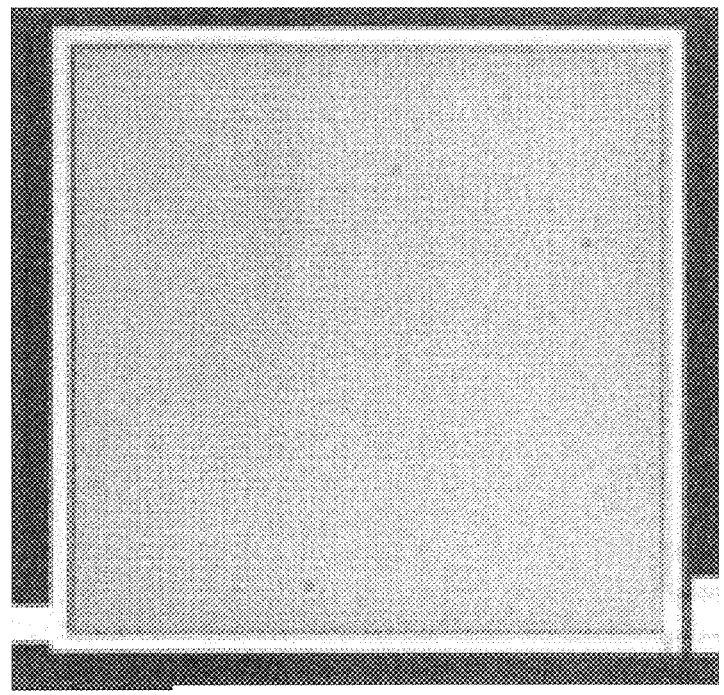

FIGS. 7A and 7B are optical microscope photographs illustrating a plastic deformation inhibiting effect of the plastic deformation inhibiting film 22. FIG. 7A is an optical microscope photograph of the humidity sensor 200 illustrated in FIG. 1 after the formation of the upper electrode 12 when a heat treatment (350° C., 3 hours) is performed on the humidity sensitive film 11. Meanwhile, FIG. 7B is an optical microscope photograph of the humidity sensor 100 according to the first embodiment after the formation of the upper electrode 12 when the heat treatment (350° C., 3 hours) is performed on the humidity sensitive film 11. In both cases, the protective film 23 is a $SiO_2$ film having a thickness of 100 nm.

As illustrated in FIG. 7A, when a plastic deformation inhibiting film 22 is not provided, multiple hillocks have been generated. It has been confirmed that the lower electrode 10 and the upper electrode 12 are short-circuited. On the other hand, as illustrated in FIG. 7B, it was confirmed that the generation of the hillock is inhibited when the plastic deformation inhibiting film 22 is provided. The plastic deformation inhibiting film 22 is a TiN film having a thickness of 100 nm.

Modification of the First Embodiment

Figure 8:
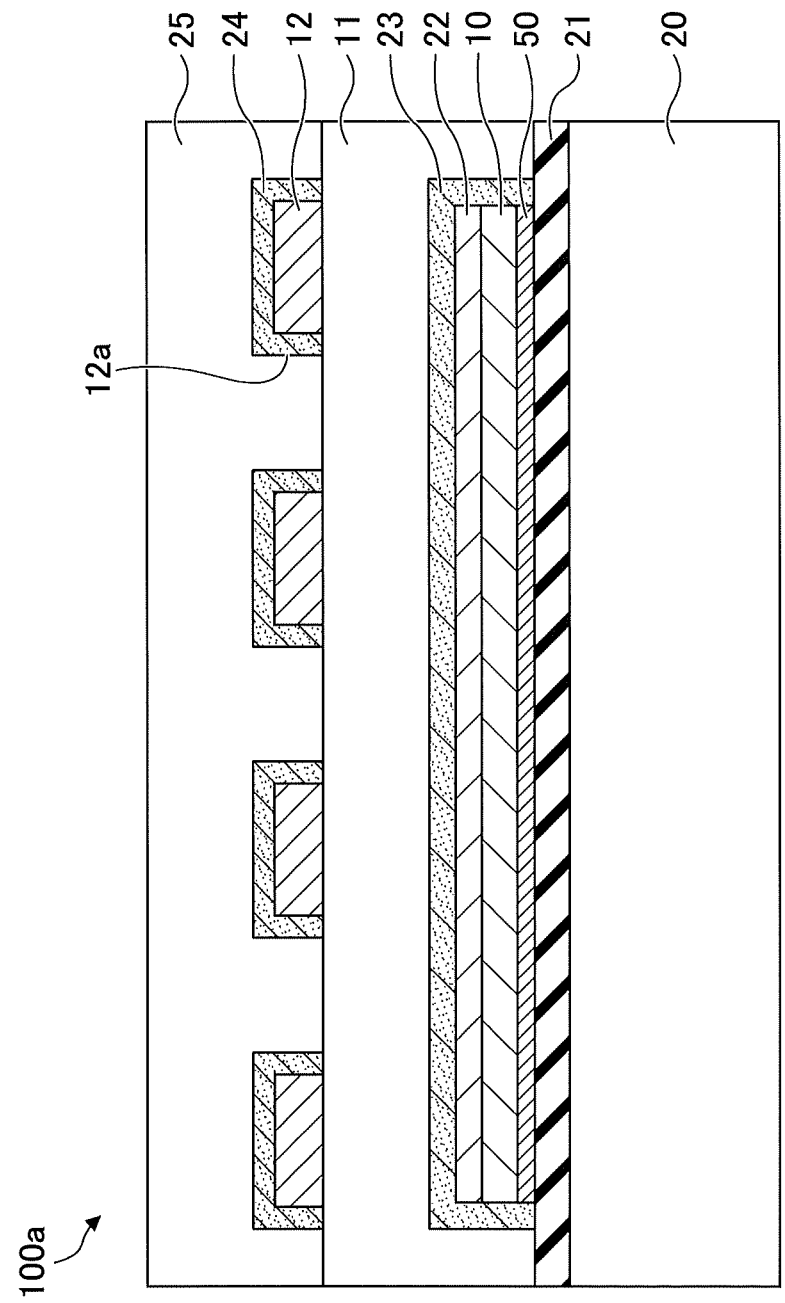
FIG. 8 is a cross-sectional view illustrating a schematic structure of a humidity sensor according to a modified example of the first embodiment.

Next, a modification of the humidity sensor 100 according to the first embodiment will be described. FIG. 8 is a cross-sectional view illustrating a schematic structure of a humidity sensor 100a according to a modification of the first embodiment.

As illustrated in FIG. 8, in the humidity sensor 100a, an underlayer 50 is formed on the lower surface of the lower electrode 10. The other structure of the humidity sensor 100a is the same as that of the humidity sensor 100 according to the first embodiment.

The underlayer 50 is, for example, a TiW film. The underlayer 50 is not limited to a TiW film, and may be a TiN film or the like. The underlayer 50 also functions as part of the lower electrode 10 because it is electrically conductive and in contact with the lower electrode 10.

The underlayer 50 is formed by forming a third conductive film for forming the underlayer 50 on the insulating film 21 before the first conductive film 10a illustrated in (B) of FIG. 5 is formed. After the third conductive film is formed, the first conductive film 10a and the second conductive film 22a are formed, and the third conductive film is patterned on the basis of the resist pattern 30 together with the first conductive film 10a and the second conductive film 22a, so that the underlayer 50 is formed under the lower electrode 10.

In this case, for example, it is preferable that the plastic deformation inhibiting film 22 and the underlayer 50 be both TiW films, and the lower electrode 10 is an aluminum alloy film (e.g., Al—Si—Cu alloy film). In addition, it is preferable that the thickness of the plastic deformation inhibiting film 22 be 60 nm and the thickness of the underlayer 50 be 200 nm.

Second Embodiment

Next, a humidity sensor according to the first embodiment will be described. In the first embodiment, the plastic deformation inhibiting film is used as the conductive film, while in the second embodiment, the plastic deformation inhibiting film is used as the insulating film.

Figure 9:
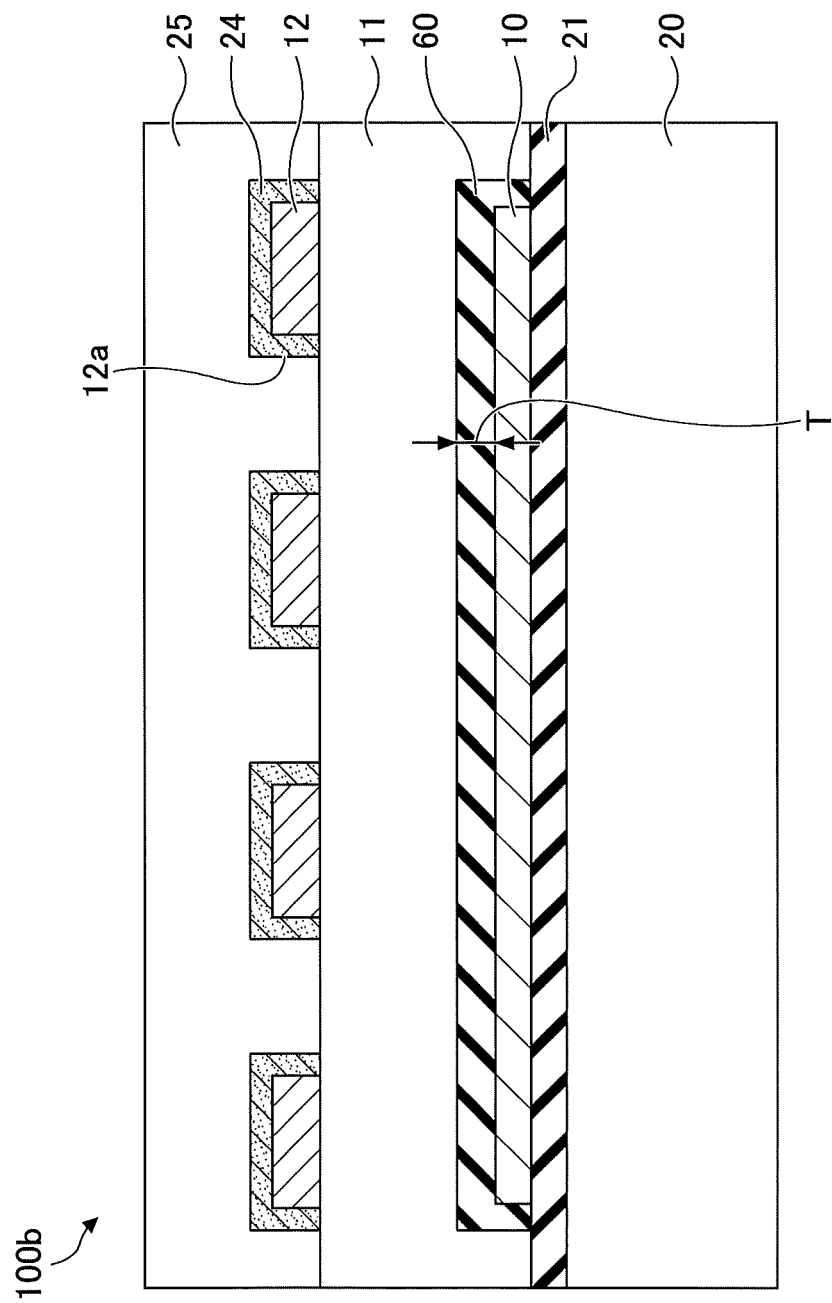
FIG. 9 is a cross-sectional view illustrating a schematic structure of the humidity sensor according to a second embodiment.

FIG. 9 is a cross-sectional view illustrating a schematic structure of a humidity sensor 100b according to the second embodiment.

As illustrated in FIG. 9, in the humidity sensor 100b, the plastic deformation inhibiting film 60 is formed by an insulating film overlying the lower electrode 10. The insulating film comprising the plastic deformation inhibiting film 60 is, for example, a SiO₂ film having a film thickness T of 400 nm or more on the lower electrode 10. The protective film 23 is not limited to the SiO₂ film, and may be a SiN film or an Al₂O₃ film. Even in this case, it is preferable that the film thickness T be 400 nm or more.

The humidity sensor 100b corresponds to a structure in which the humidity sensor 100 of the first embodiment removes the plastic deformation inhibiting film 22 and thickens the protective film 23.

The other structure of the humidity sensor 100b is the same as that of the humidity sensor 100 according to the first embodiment.

In this way, even when the plastic deformation inhibiting film 60 is used as the insulating film, the film thickness T is increased, thereby preventing the occurrence of migration phenomena in the lower electrode 10 and preventing the generation of a hillock.

Figure 10A:
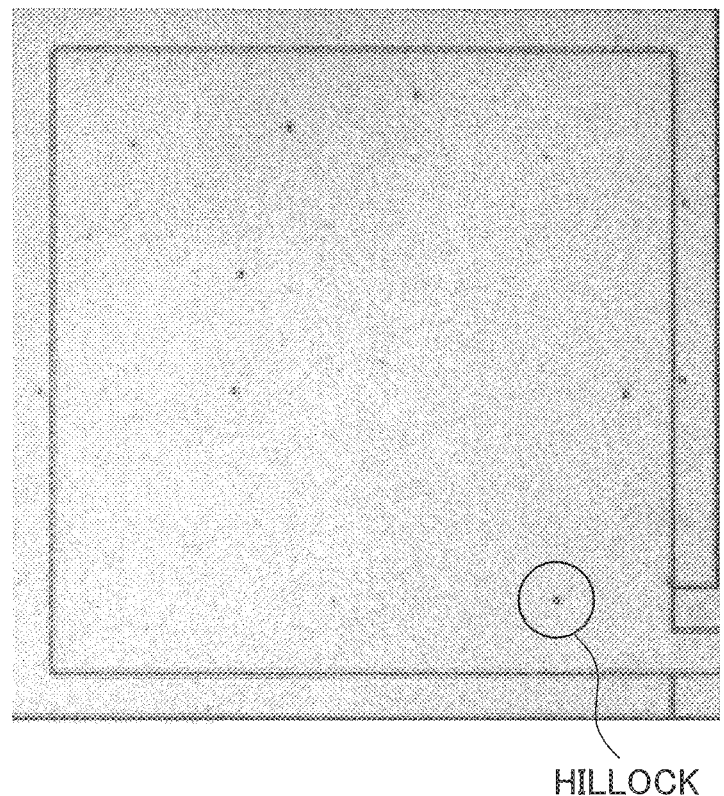
FIGS. 10A and 10B are optical microscope photographs illustrating the effect of inhibiting the hillock by thickening a protective film.
Figure 10B:
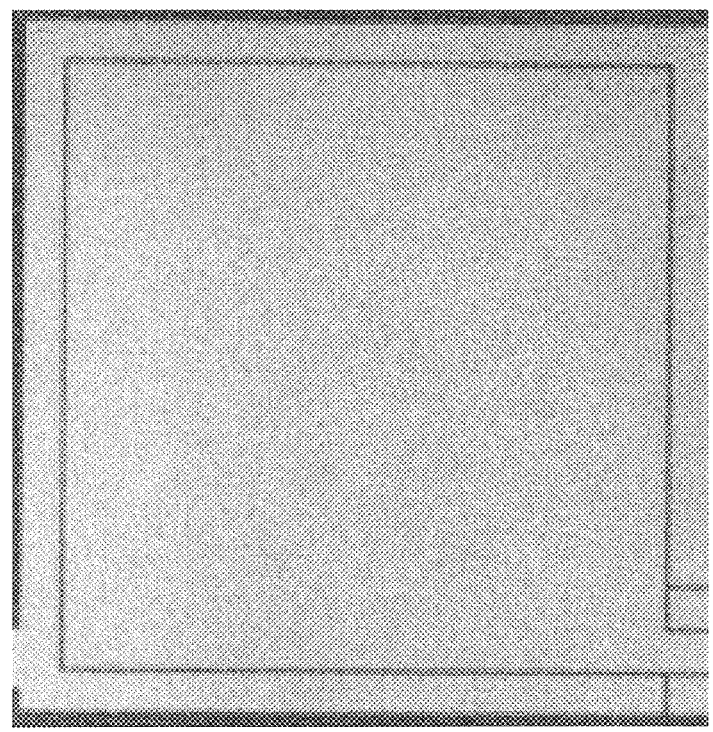

FIGS. 10A and 10B are optical microscope photographs illustrating the effect of inhibiting the hillock by thickening the protective film 23. FIG. 10A is an optical microscope photograph after heat treatment when T=100 nm and heat treatment (350° C., 3 hours) is performed on the humidity sensitive film 11. Meanwhile, FIG. 10B is an optical microscope photograph after heat treatment when T=400 nm and heat treatment (350° C., 3 hours) is performed on the humidity sensitive film 11. In both cases, the protective film 23 is a SiO₂ film.

As illustrated in FIG. 10A, when T=100 nm, multiple hillocks were generated and it was confirmed that the lower electrode 10 and the upper electrode 12 were short-circuited. On the other hand, as illustrated in FIG. 10B, it was confirmed that the hillock is inhibited from being generated in case of T=400 nm.

In the humidity sensor 100b according to the second embodiment, the thicker the film thickness T, the more effective the inhibition of the hillock is. However, in the humidity sensor 100b, because the plastic deformation inhibiting film 60 is insulative, it does not function as part of the lower electrode 10 and does not absorb water, so that the change in the dielectric constant of the humidity sensitive film 11 decreases as the film thickness T increases. Therefore, the larger the film thickness T, the lower the sensitivity for detecting the humidity by the humidity sensor 100b. Accordingly, it is preferable that the film thickness T be about 400 nm without increasing the film thickness more than necessary.

As a modified example of the second embodiment, as in the modified example of the first embodiment illustrated in FIG. 8, a TiW film or a TiN film may be disposed on the lower surface of the lower electrode 10 as an underlayer.

In the first and second embodiments described above, the protective film 24 is provided on the upper electrode 12. However, a plastic deformation inhibiting film similar to the aforementioned plastic deformation inhibiting film 22 or the plastic deformation inhibiting film 60 may be provided in place of the protective film 24 or between the upper electrode 12 and the protective film 24. The overcoat film 25 covering the upper electrode 12 is subjected to heat treatment (step S10 of FIG. 4), which may result in generation of the hillock, but by providing a plastic deformation inhibiting film on the upper electrode 12, the generation of the hillock is inhibited. However, even if the hillock occurs on the upper electrode 12, it is not necessary to provide the plastic deformation inhibiting film on the upper electrode 12, because this hillock does not cause shorting between the electrodes.

Although the preferred embodiments of the invention have been described in detail, the invention is not limited to the embodiments described above, and various modifications and substitutions can be made to the above embodiments without departing from the scope of the invention.

Also, in the present disclosure, the term "on a substrate" includes not only contacting the surface of the substrate, but also indirectly disposed on the surface of the substrate via another element. The same interpretation applies to the phrase "on a film" or "on an electrode".

EXPLANATION OF SYMBOLS

10 Lower electrode
10a First conductive film
11 Moisture sensitive film
12 Upper electrode
12a Opening
20 Insulated substrate
21 Insulating film
22 Plastic deformation inhibiting film
22a Second conductive film
23 Protective film
24 Protective film
25 Overcoat film
30 Resist pattern
40 Protrusions (Hillocks)
50 Subterranean film
60 Plastic deformation inhibiting film
100, 100a, 100b, 200 Humidity Sensor According to the disclosed technique, the humidity sensor is substantialized which enables inhibition of the generation of the hillock on the lower electrode.

The description of the humidity sensor is described in such a way as to facilitate the understanding of the embodiment by thoroughly explaining the humidity sensor and to assist in further advancing the technology.

Accordingly, the requirements set forth in the embodiments are not limited. Also, the illustration in the embodiments does not imply its advantages or disadvantages.

Although the humidity sensor has been described, various modifications, substitutions, and modifications can be made without departing from the spirit of the invention.

What is claimed is:
1. A humidity sensor comprising:
a lower electrode formed on a substrate;
a plastic deformation inhibiting film formed on the lower electrode to inhibit plastic deformation of the lower electrode;
a humidity sensitive film covering the lower electrode through the plastic deformation inhibiting film; and
an upper electrode formed on the humidity sensitive film, wherein the plastic deformation inhibiting film is made from a material harder than the lower electrode, and wherein the plastic deformation inhibiting film is a conductive film.

2. The humidity sensor according to claim 1,
wherein the humidity sensitive film is made from polyimide.

3. The humidity sensor according to claim 1,
wherein the conductive film is a TiN film or a TiW film.

4. The humidity sensor according to claim 1,
wherein the lower electrode is made of an aluminum alloy film.

5. The humidity sensor according to claim 1,
wherein the underlayer is a TiN film or a TiW film.

6. A humidity sensor comprising:
a lower electrode formed on a substrate;
a plastic deformation inhibiting film formed on the lower electrode to inhibit plastic deformation of the lower electrode;
a humidity sensitive film covering the lower electrode through the plastic deformation inhibiting film; and
an upper electrode formed on the humidity sensitive film,
wherein the plastic deformation inhibiting film is an insulating film, and
wherein the insulating film is a $SiO_2$ film with a film thickness of 400 nm or greater.

7. The humidity sensor according to claim 6,
wherein the humidity sensitive film is made from polyimide.

8. The humidity sensor according to claim 6,
wherein the lower electrode is made of an aluminum alloy film.

9. The humidity sensor according to claim 6,
wherein the underlayer is a TiN film or a TiW film.

10. A method for manufacturing a humidity sensor comprising:
forming an underlayer made with a TiN film or a TiW film so as to be disposed on a substrate;
forming a lower electrode and a plastic deformation inhibiting film disposed on the lower electrode to inhibit plastic deformation of the lower electrode by processing a first conductive film and a second conductive film laminated on the underlayer;
forming a humidity sensitive film so as to cover the lower electrode through the plastic deformation inhibiting film;
performing a heat treatment for the humidity sensitive film; and
forming an upper electrode on the humidity sensitive film.

11. The humidity sensor according to claim 10,
wherein the plastic deformation inhibiting film is made from a material harder than the lower electrode,
wherein the plastic deformation inhibiting film is a conductive film.

12. The humidity sensor according to claim 10,
wherein the plastic deformation inhibiting film is a TiN film or a TiW film.

13. A method for manufacturing a humidity sensor comprising:
forming a lower electrode disposed on a substrate and a conductive film disposed on the lower electrode to inhibit plastic deformation of the lower electrode by processing first conductive film and a second conductive film laminated on the substrate, the conductive film being made from a material harder than the lower electrode;
forming a humidity sensitive film so as to cover the lower electrode through the conductive film;
performing a heat treatment for the humidity sensitive film; and
forming an upper electrode on the humidity sensitive film.

14. The method for manufacturing the humidity sensor according to claim 13,
wherein the conductive film is a TIN film or a TiW film.

* * * * *